US009085252B2

(12) United States Patent
Gholap et al.

(10) Patent No.: US 9,085,252 B2
(45) Date of Patent: Jul. 21, 2015

(54) VEHICLE SEAT ASSEMBLY WITH DUAL LOCKED SEATING POSITIONS AND METHOD OF ADJUSTING A VEHICLE SEAT

(71) Applicant: GM GLOBAL TECHNOLOGY OPERATIONS LLC, Detroit, MI (US)

(72) Inventors: Shrikant A. Gholap, Bangalore (IN); Anand V. Iyer, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 59 days.

(21) Appl. No.: 13/875,537

(22) Filed: May 2, 2013

(65) Prior Publication Data

US 2014/0327266 A1 Nov. 6, 2014

(51) Int. Cl.
*B60N 2/44* (2006.01)
*B60N 2/22* (2006.01)
*B60N 2/36* (2006.01)

(52) U.S. Cl.
CPC .............. *B60N 2/442* (2013.01); *B60N 2/2245* (2013.01); *B60N 2/366* (2013.01)

(58) Field of Classification Search
CPC ....... B60N 2/442; B60N 2/2245; B60N 2/366
USPC ............ 296/65.16, 68.1; 297/216.12, 378.12, 297/378.13, 354.12
See application file for complete search history.

(56) References Cited

U.S. PATENT DOCUMENTS

| 6,048,005 | A | * | 4/2000 | Rotondi | ........................ 292/262 |
| 6,132,000 | A | * | 10/2000 | Tanaka | ..................... 297/378.13 |
| 6,908,137 | B2 | | 6/2005 | Doxey et al. | |
| 7,255,399 | B2 | | 8/2007 | White et al. | |
| 2013/0009440 | A1 | | 1/2013 | Majima et al. | |

FOREIGN PATENT DOCUMENTS

EP        1754623 A2     2/2007

\* cited by examiner

*Primary Examiner* — Glenn Dayoan
*Assistant Examiner* — Melissa A Black
(74) *Attorney, Agent, or Firm* — Quinn Law Group, PLLC

(57) ABSTRACT

A vehicle seat assembly adjacent a vehicle body panel includes a vehicle seat that has a seat bottom and a seat back pivotable with respect to the seat bottom. The vehicle seat assembly includes a striker assembly with a fixed striker fixed to the vehicle body panel, and a pivotable striker pivotably supported on the fixed striker. The pivotable striker is pivotable between a first position in which the pivotable striker extends further than the fixed striker toward the seat back, and a second position in which the fixed striker extends further than the pivotable striker toward the seat back. A latching mechanism fixed to the seat back latches to the pivotable striker when the pivotable striker is in the first position, and latches to the fixed striker when the pivotable striker is in the second position.

20 Claims, 4 Drawing Sheets

VEHICLE SEAT ASSEMBLY WITH DUAL LOCKED SEATING POSITIONS AND METHOD OF ADJUSTING A VEHICLE SEAT

TECHNICAL FIELD

The present teachings generally include a vehicle seat assembly.

BACKGROUND

Relatively small cars are valued for their relatively high fuel efficiency and low cost. Due to their small size, cargo space behind a rear seat is often very limited. If more cargo space is provided in a small vehicle, it is usually at the cost of rear seat comfort.

SUMMARY

A vehicle seat assembly for a vehicle is provided that can be selectively locked in one of two different seating positions to provide either greater comfort or greater cargo space. A vehicle user can thus adapt the seating position to suit different needs. Specifically, a vehicle seat assembly adjacent a vehicle body panel includes a vehicle seat that has a seat bottom and a seat back pivotable with respect to the seat bottom. The vehicle seat assembly includes a striker assembly with a fixed striker fixed to the vehicle body panel, and a pivotable striker pivotably supported on the fixed striker. The pivotable striker is pivotable between a first position in which the pivotable striker extends further than the fixed striker toward the seat back, and a second position in which the fixed striker extends further than the pivotable striker toward the seat back.

The vehicle seat assembly also includes a latching mechanism fixed to the seat back. The latching mechanism latches to the pivotable striker when the pivotable striker is in the first position to lock the seat back in a first seating position, and latches to the fixed striker when the pivotable striker is in the second position to lock the seat back in a second seating position. In the first seating position, the seat back is more forward in the vehicle, creating greater volume in a cargo compartment rearward of the seat back. A method of adjusting a vehicle seat to move the seat between the locked first seating position and the locked second seating position is also provided.

The seat assembly may be easily adaptable to existing vehicle architectures without extensive redesign as vehicle seats with latching mechanisms within a seat back are currently in use. Moreover, the striker assembly can be used across different vehicle architectures by varying its position on the vehicle body. The striker assembly is of relatively low mass and cost.

The above features and advantages and other features and advantages of the present teachings are readily apparent from the following detailed description of the best modes for carrying out the present teachings when taken in connection with the accompanying drawings.

DETAILED DESCRIPTION

Figure 1:
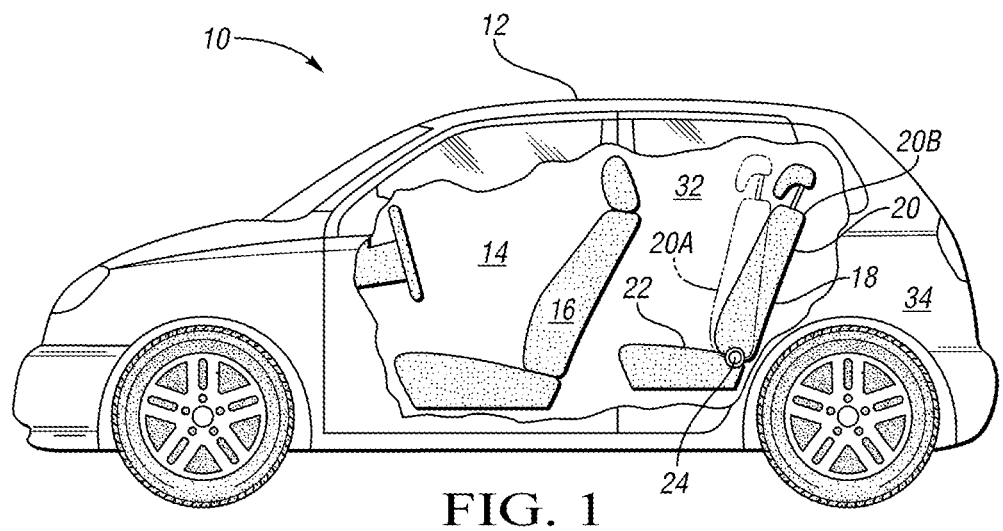
FIG. 1 is a schematic side view illustration of a vehicle with a seat assembly having a seatback pivoted between a first position shown in phantom and a second position.
Figure 2:
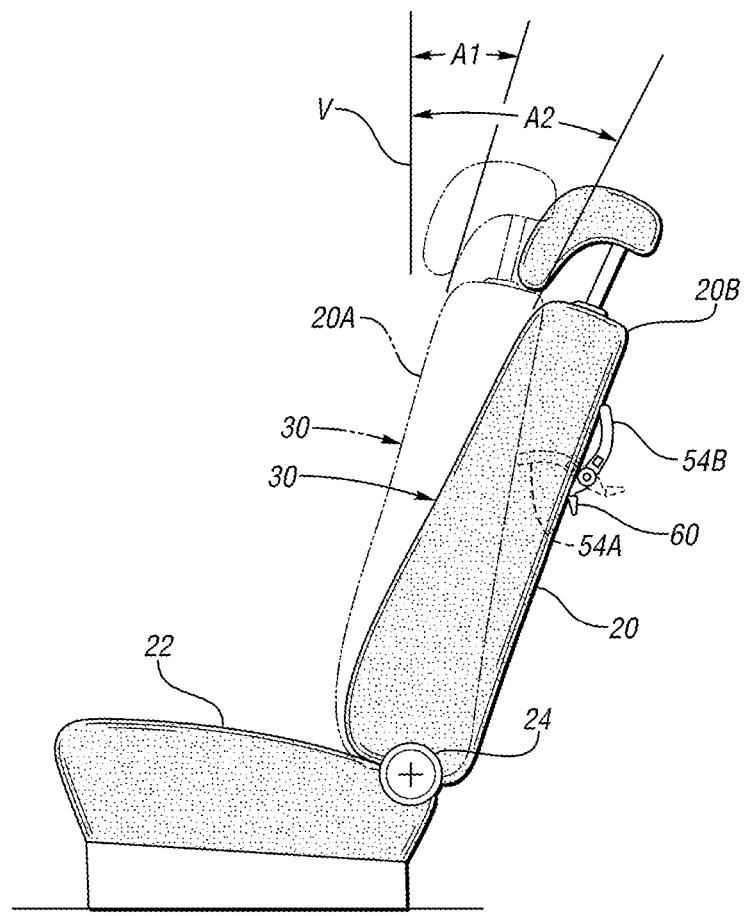
FIG. 2 is a schematic side view illustration of the seat assembly of FIG. 1, illustrating a pivotable striker in a first position shown in phantom and in a second position.

Referring to the drawings, wherein like reference numbers refer to like components throughout the several views. FIG. 1 shows a vehicle 10 with a vehicle body 12 that defines an interior space 14. A front driver's seat 16 and at least one rear seat 18 are positioned in the interior space 14. The rear seat 18 has a seat back 20 and a seat bottom 22. The seat back 20 is pivotable with respect to the seat bottom 22 about a pivot axis 24. As shown in FIGS. 1 and 2, the seat back 20 pivots forward and rearward in the interior space 14. The seat back 20 is shown in a first seating position 20A in phantom and in a second seating position 20B in solid. The pivotable range of the seat back 20 can be configured to allow the seat back 20 to pivot further forward of the first seating position 20A shown and even further rearward of the second seating position 20B. However, as explained herein, the seat back 20 can be locked at the first and second seating positions 20A, 20B. A striker assembly 26 shown in FIG. 3 allows the seat back 20 to be locked to the vehicle body 12 in the first seating position 20A to establish a first seat position for a passenger, and to alternatively be locked in the second seating position 20B to establish a second seat position for the passenger.

FIG. 2 shows that a back support surface 30 of the seat back 20 is at a first acute angle A1 relative to vertical V when the seat back 20 is in the first seating position 20A, and the back support surface 30 is at a second acute angle A2 relative to vertical V when the seat back 20 is in the second seating position 20B. The first and second acute angles A1 and A2 are also referred to herein as a first seat back angle and a second seat back angle, respectively. Corresponding torso angles would be substantially the same as the seat back angles A1 and A2, where a torso angle is defined as the angle between an axis of a mannequin used for seat design and the vertical axis V. The first acute angle A1 is less than the second acute angle A2.

Referring again to FIG. 1, the rear vehicle seat 18 divides the interior space 14 into a passenger compartment 32 forward of the seat back 20, and a cargo compartment 34 rearward of the seat back 20. When the seat back 20 is in the first position 20A, the volume of the cargo compartment 34 increases. In one embodiment, the first seat back angle A1 is 22 degrees and the second seat back angle A2 is 26 degrees. In the vehicle 10 of FIG. 1, moving the seat back 20 from the second seating position 20B to the first seating position 20A, and moving a substantially similar second rear seat (not shown in the side view of FIG. 1) in a like manner, increases the volume of the cargo compartment by 10 percent.

Figure 6:
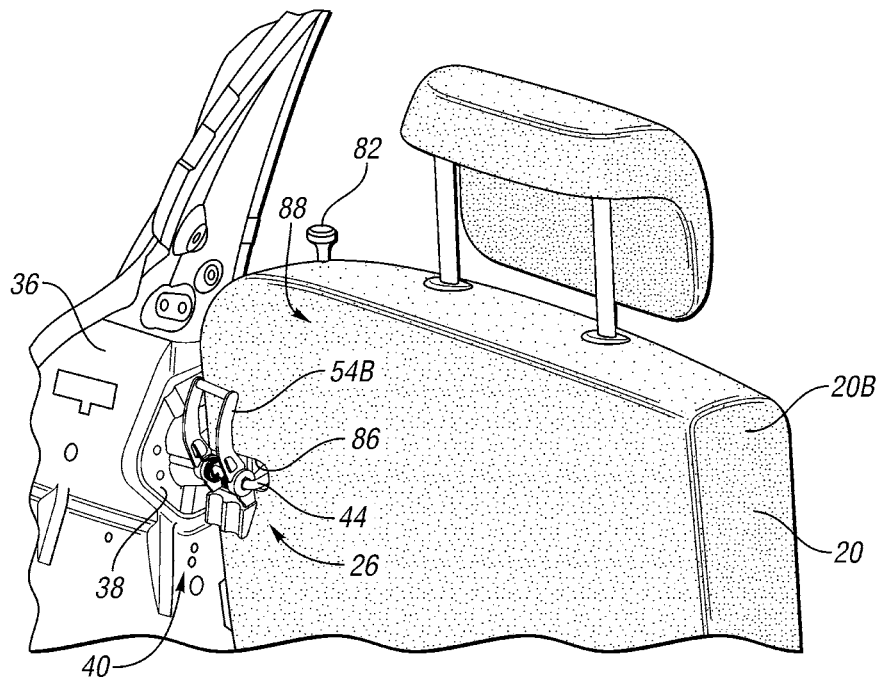
FIG. 6 is a schematic fragmentary illustration of the striker assembly with the latching mechanism within the seat back latched to the fixed striker.
Figure 7:
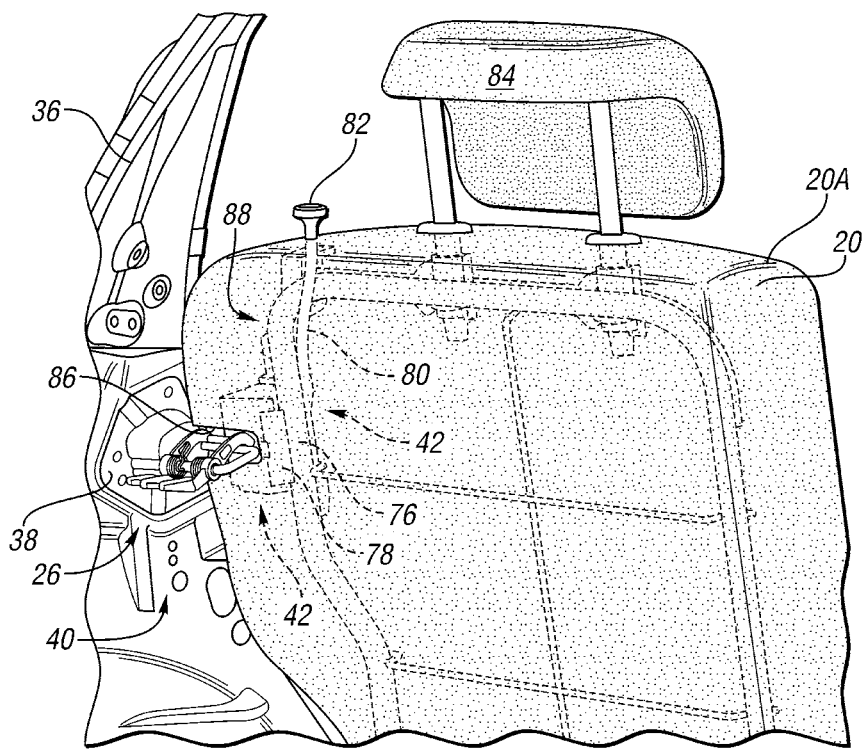
FIG. 7 is a schematic fragmentary illustration in perspective view of the striker assembly with the latching mechanism within the seat back latched to the pivotable striker.

As best shown in FIGS. 6 and 7, the striker assembly 26 is secured to a vehicle body panel 36 via a vehicle body bracket 38 that is secured to the vehicle body panel 36. In one example embodiment, the vehicle body panel 36 can be the wheel house rim. The seat back 20 is adjacent to the vehicle body panel 36 and the vehicle body bracket 38. In FIG. 1, the vehicle body panel 36 adjacent the seat 18 is removed, so the striker assembly 26 is not shown. A vehicle seat assembly 40 includes the vehicle seat 18, the striker assembly 26, and a latching mechanism 42 that is largely contained within the seat back 20 in the embodiment shown.

Figure 3:
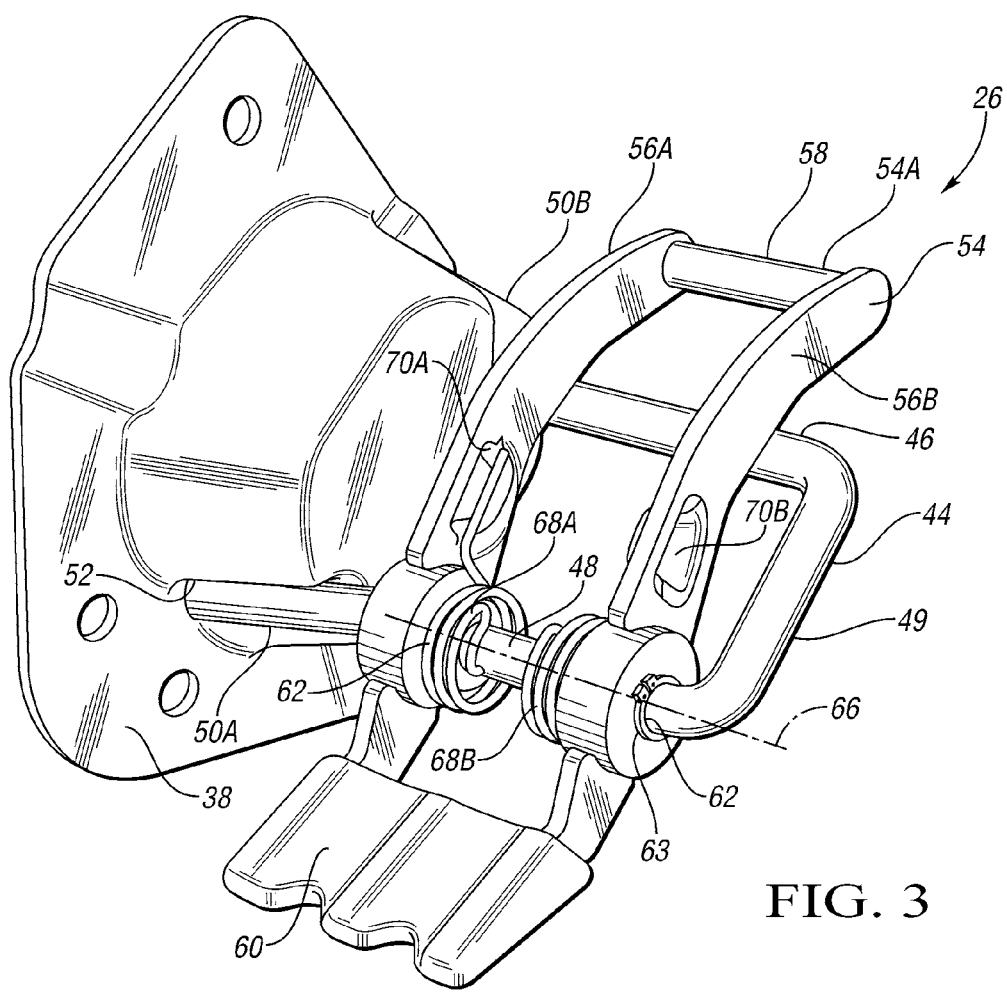
FIG. 3 is a schematic perspective illustration of the striker assembly having a fixed striker and the pivotable striker of FIG. 2.

FIG. 3 shows the striker assembly 26 in detail. The striker assembly 26 includes a fixed striker 44 that is fixed to the vehicle body bracket 38. The fixed striker 44 has a generally U-shaped portion with a first arm 46, a second arm 48, and a midportion 49 connecting the arms 46, 48. End portions 50A, 50B of the arms 46, 48 are welded to the vehicle body bracket 38 at recesses 52 (one shown) to allow the vehicle body bracket 38 to stabilize the fixed striker 44 by providing a reaction surface at the recesses 52.

The striker assembly 26 also includes a pivotable striker 54. The pivotable striker 54 has two pivot arms 56A, 56B, and a striker bar 58 extending between and connected to both pivot arms 56A, 56B. The pivotable striker 54 also includes a handle 60 connected to the pivot arms 56A, 56B. Each pivot arm 56A, 56B has an opening 62 through which the second arm 48 of the fixed striker 44 extends so that the pivotable striker 54 is pivotably supported by the fixed striker 44 at the second arm 48. Circle clips 63 (one visible in FIG. 3) help to maintain the position of the arms 46, 48 along the second arm 48 of the fixed striker 44. Another circle clip 63 (not visible in FIG. 3) is positioned at the outer side of arm 56A adjacent the vehicle body bracket 38.

Figure 5:
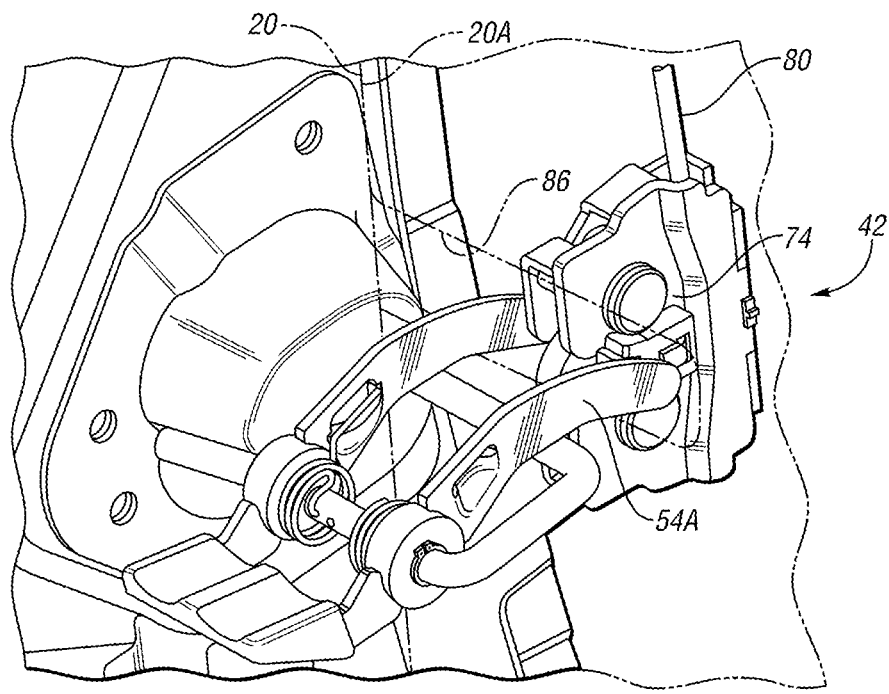
FIG. 5 is a schematic fragmentary illustration in perspective view of the striker assembly with the latching mechanism latched to the pivotable striker, and with the seat back shown in phantom.

The pivotable striker 54 can pivot with respect to the fixed striker 44 about a pivot axis 66 that extends through the second arm 48. A biasing mechanism is provided in the form of two torsion springs 68A, 68B. Torsion spring 68A has one end secured to the arm 48 of the fixed striker 44 and another end secured to the pivot arm 56A of the pivotable striker 54 within a recess 70A of the pivot arm 56A. Torsion spring 68B has one end secured to the arm 48 of the fixed striker 44 and another end secured to the pivot arm 56B of the pivotable striker 54 within a recess 70B of the pivot arm 56A. The torsion springs 68A, 68B bias the pivotable striker 54 to a first position 54A shown in FIG. 3, in which the pivot arms 56A, 56B rest against the arm 46 of the fixed striker 44. In the first position 54A, the pivotable striker 54 extends further forward in the vehicle 10 toward the seat back 20, as illustrated in FIGS. 5 and 7, and allows the seat back 20 to be locked to the striker bar 58 of the pivotable striker 54 in the first position 20A of FIGS. 1, 2, 5, and 7 as discussed herein.

Figure 4:
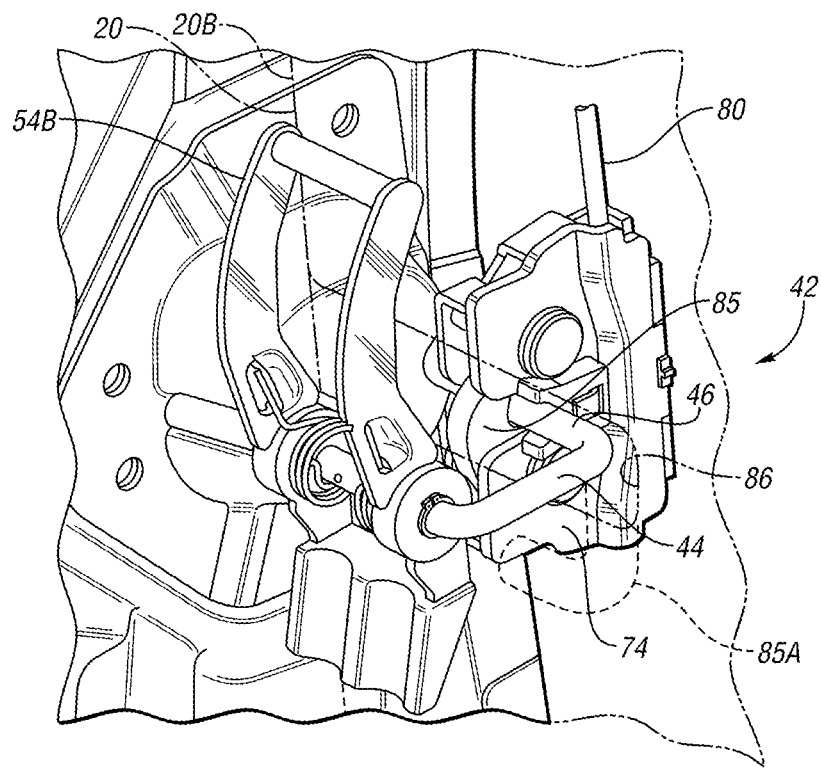
FIG. 4 is a schematic fragmentary illustration in perspective view of the striker assembly with a latching mechanism within the seat back latched to the fixed striker, with the seat back shown in phantom.

The pivotable striker 54 can be rotated counterclockwise with respect to the first position 54A of FIG. 3, such as by pressing down on the handle 60, to a second position 54B shown in FIGS. 2, 4, and 6. Pivoting the pivotable striker 54 to the second position 54B requires force to overcome the force of the torsion springs 68A, 68B. When the pivotable striker 54 is in the second position 54B, the fixed striker 44 extends further toward the seat back 20 than the pivotable striker 54, and allows the seat back 20 to be locked to the first arm 46 of the fixed striker 44 in the second position 20B of FIGS. 1, 2, 4, and 6 as discussed herein.

As best shown in FIGS. 4-7, the latching mechanism 42 is fixed within the seat back 20. The seat back 20 is represented only in phantom in FIGS. 4 and 5 to allow a view of the internal portions of the latching mechanism 42. The latching mechanism 42 includes a latch 74 that is within the seat back 20 and secured to a seat frame member 76 by a support bracket 78 as shown in FIG. 7. The latching mechanism 42 includes a rod 80 that is connected to the latch 74 and extends out of the seat back 20 to a release knob 82 at an upper portion of the seat back 20 near a head rest 84. Those skilled in the art will readily understand the ability of the latch 74 to be unlatched by pulling upward on the knob 82 to move the rod 80 and an attached portion 85 of the latch 74 (shown in FIG. 4) as well. The attached portion 85 pivots downward to position 85A when the rod 80 is pulled upward, so that the latch 74 no longer surrounds the arm 46. A person skilled in the art will readily understand the release mechanism of the latch 74.

The seat back 20 has an opening 86 in a back surface 88 of the seat back 20. The opening 86 is adjacent the latch 74. The opening 86 is configured to be of a size sufficient to receive the pivotable striker 54 at the latch 74 when the pivotable striker 54 is in the first position 54A. That is, the striker bar 58 and a portion of the pivot arms 56A, 56B extend through the outer material of the seat back 20 at the opening 86 so that the latch 74 latches to the striker bar 58. The latch 74 is configured to automatically move from a released position to a latched position when force is applied to the attached portion 85 of the latch 74. In other words, when the seat back 20 is moved so that the striker bar 58 contacts the latch 74, the latch 74 automatically closes around the striker bar 58 to lock the seat back 20 into the first position 20A.

The opening 86 is also of a sufficient size to receive the arm 46 of the fixed striker 44 when the pivotable striker 54 is pivoted to the second position 54B and the seat back 20 is moved toward the fixed striker 44. That is, the arm 46 and some of the midportion 49 of the fixed striker 44 extend through the outer material of the seat back 20 at the opening 86 when the seat back 20 is moved toward the fixed striker 44 so that the arm 46 contacts the latch 74, and the latch 74 closes around the arm 46 to lock the seat back 20 into the second position 20B. Once the latch 74 latches to the arm 46, and the handle 60 of the pivotable striker 54 is released, the biasing force of the biasing springs 68A, 68B will cause the pivotable striker 54 to be biased against the back surface 88 of the seat back 20 (i.e., against fabric and an underlayer of foam). The pivotable striker 54 will therefore be held in a stationary position, and will not create noise when in the second position 54B with the vehicle 10 running. The pivotable striker 54 will also be stationary when locked in the first position 54A, and will not create noise in that position either.

Regardless of whether the pivotable striker 54 is in the first position 54A or the second position 54B, the handle 60 extends into the cargo compartment 34 rearward of the seat back 20. The handle 60 can be used as an anchor on which a net or rope can be hung or tied. The net or rope can be used to tie down cargo. If a second rear seat adjacent the seat 18 also has a striker assembly with a handle adjacent the opposite body panel, the cargo net or rope could be tied or hung on both handles.

The seat back 20 of the rear vehicle seat 18 can be adjusted by unlatching the latching mechanism 42 within the seat back 20 from the pivotable striker 54 that is in the first position 54A, thereby releasing the seat back 20 from the locked first seating position 20A. In the embodiment shown, the latching mechanism 42 is unlatched by pulling upward on the release knob 82 in FIG. 7. The seat back 20 is then pivoted away from the pivotable striker 54 (i.e., forward in the vehicle 10), and the pivotable striker 54 is pivoted counterclockwise in FIG. 3 to pivot with respect to the fixed striker 44 from the first position 54A (shown FIG. 5) to the second position 54B (shown in FIG. 4). This pivoting is done manually by a user pressing downward on the handle 60. A user can access the seat assembly 40 from the cargo compartment 34 to accomplish these steps, such as by holding the seat back 20 with the right hand and pivoting the pivotable striker by pushing on the handle 60 with the left hand. The fixed striker 44 now extends further toward the seat back 20 than the pivotable striker 54. While holding the handle 60 down to maintain the pivotable striker 54 in the second position 54B against the force of the biasing mechanisms (springs 68A, 68B), the seat back 20 is then pivoted toward the fixed striker 44 (i.e. rearward in the vehicle 10) until the latching mechanism 42 latches to the fixed striker 44 as shown in FIGS. 4 and 6, the seat back 20 thereby being locked in the second seating position 20B with respect to the vehicle body panel 36. The handle 60 of the pivotable striker 54 can be released, and the pivotable striker 54 will rotate forward due to the biasing force of the springs 68A, 68B until the pivotable striker 54 rests against the back surface 88 of the seat back in the second position 54B as shown in FIG. 6. These steps can be followed when a user prefers the rear seat 18 to be in the second seating position 20B with the larger seat back angle A2 of FIG. 2 and the associated lesser volume of the cargo compartment 34 of FIG. 1.

When a user instead prefers to have a larger volume cargo compartment 34, the user can lock the seat back 20 in the first seating position 20A by first unlatching the latching mechanism 42 from the fixed striker 44 by pulling upward on the release knob 82 in FIG. 6. With the seat back 20 now released from the latch 74, the seat back 20 is pivoted away from the fixed striker 44 (i.e., pivoted slightly forward in the vehicle 10), so that the fixed striker 44 no longer extends through the opening 86. The user does not hold down the handle 60, and the pivotable striker 54 automatically pivots to the first position 54A shown in FIG. 3. The seat back 20 is then pivoted slightly rearward in the vehicle toward the pivotable striker 54 until the latch 74 latches to the striker bar 58 of the pivotable striker 54 as shown in FIGS. 5 and 7, the seat back 20 thereby being locked in the first seating position 20A with the smaller seat back angle A1, increasing the volume of the cargo compartment 34 of FIG. 1.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A vehicle seat assembly adjacent a vehicle body panel comprising:
   a vehicle seat having a seat bottom and a seat back pivotable with respect to the seat bottom;
   a fixed striker fixed to the vehicle body panel;
   a pivotable striker pivotably supported on the fixed striker and pivotable between a first position in which the pivotable striker extends further than the fixed striker toward the seat back, and a second position in which the fixed striker extends further than the pivotable striker toward the seat back;
   a latching mechanism fixed to the seat back; wherein the latching mechanism latches to the pivotable striker when the pivotable striker is in the first position to lock the seat back in a first seating position, and latches to the fixed striker when the pivotable striker is in the second position to lock the seat back in a second seating position;
   wherein the fixed striker is generally U-shaped and has a first arm and a second arm spaced from one another, and has a midportion extending between and connected to the first arm and the second arm; wherein the second arm supports the pivotable striker and defines an axis of rotation along a length of the second arm;
   wherein the pivotable striker has two pivot arms each having an opening through which the second arm of the fixed striker extends so that the pivotable striker is supported on and pivotable about the axis of rotation of the second arm of the fixed striker; wherein the pivotable striker has a striker bar extending between the two pivot arms; and
   wherein the latching mechanism latches to the striker bar when the pivotable striker is in the first position, and latches to the first arm of the fixed striker when the pivotable striker is in the second position.

2. The vehicle seat assembly of claim 1, further comprising:
   a biasing mechanism biasing the pivotable striker to the first position.

3. The vehicle seat assembly of claim 2, wherein the biasing mechanism biases the pivotable striker against the seat back when the latching mechanism latches to the fixed striker.

4. The vehicle seat assembly of claim 2, wherein the biasing mechanism is a torsion spring operatively connected to the fixed striker and to the pivotable striker.

5. The vehicle seat assembly of claim 1, wherein a back support surface of the seat back is at a first acute angle relative to vertical when the seat back is in the first seating position, and the back support surface is at a second acute angle relative to vertical when the seat back is in the second seating position; and wherein the first acute angle is less than the second acute angle.

6. The vehicle seat assembly of claim 1, wherein the pivot arms of the pivotable striker both rest against and are supported by the first arm of the fixed striker when the pivotable striker is in the first position.

7. The vehicle seat assembly of claim 1, wherein the pivotable striker includes a handle extending from the pivot arms opposite the striker bar.

8. The vehicle seat assembly of claim 1, wherein the latching mechanism is within the seat back; wherein the seat back has an opening configured to receive the pivotable striker at the latching mechanism when the pivotable striker is in the first position, and configured to receive the fixed striker at the latching mechanism when the pivotable striker is in the second position.

9. The vehicle seat assembly of claim 8, wherein the latching mechanism has a release knob outside of the seat back, a latch positioned at the opening, and a rod extending through the seat back from the release knob to the latch.

10. A vehicle comprising:
    a vehicle body having a body panel that at least partially defines an interior space;
    a vehicle seat assembly adjacent the body panel and within the interior space; wherein the vehicle seat assembly includes:
       a vehicle seat having a seat bottom and a seat back pivotable with respect to the seat bottom; wherein the seat back divides the interior space into a passenger compartment forward of the seat back and a cargo compartment rearward of the seat back;
       a fixed striker fixed to the vehicle body panel;
       a pivotable striker pivotably supported on the fixed striker and pivotable between a first position in which the pivotable striker extends further forward toward the seat back than the fixed striker, and a second position in which the fixed striker extends further forward toward the seat back than the pivotable striker;

a latching mechanism fixed to the seat back; wherein the latching mechanism latches to the pivotable striker when the pivotable striker is in the first position to lock the seat back in a first seating position, and latches to the fixed striker when the pivotable striker is in the second position to lock the seat back in a second seating position; the seat back thereby being further forward in the vehicle when the pivotable striker is in the first position so that the cargo compartment rearward of the seat back has a greater volume when the seat back is in the first position;

wherein the pivotable striker has two pivot arms and a striker bar extending between the two pivot arms; wherein the two pivot arms are mounted on and pivotable about the fixed striker; wherein the pivotable striker includes a handle extending into the cargo compartment; and wherein the handle extends from the pivot arms opposite the striker bar.

11. The vehicle of claim 10, wherein a back support surface of the seat back is at a first acute angle relative to vertical when the seat back is in the first seating position, and the back support surface is at a second acute angle relative to vertical when the seat back is in the second seating position; and wherein the first acute angle is less than the second acute angle.

12. The vehicle of claim 10, further comprising:
a biasing mechanism biasing the pivotable striker toward the first position even when the pivotable striker is in the second position.

13. The vehicle of claim 12, wherein the biasing mechanism biases the pivotable striker against the seat back when the latching mechanism latches to the fixed striker.

14. The vehicle of claim 12, wherein the biasing mechanism is a torsion spring operatively connected to the fixed striker and to the pivotable striker.

15. The vehicle of claim 10, wherein the latching mechanism is within the seat back; wherein the seat back has an opening configured to receive the pivotable striker at the latching mechanism when the pivotable striker is in the first position, and configured to receive the fixed striker at the latching mechanism when the pivotable striker is in the second position.

16. The vehicle of claim 15, wherein the latching mechanism has a release knob outside of the seat back, a latch positioned at the opening, and a rod extending through the seat back from the release knob to the latch.

17. A method of adjusting a vehicle seat having a seat back, the method comprising:
unlatching a latching mechanism within the seat back from a pivotable striker that is operatively connected to a vehicle body, thereby releasing the seat back from a locked first seating position with respect to the vehicle body;
pivoting the seat back away from the pivotable striker;
pivoting the pivotable striker from a first position in which the pivotable striker extends further than the fixed striker toward the seat back to a second position in which the fixed striker extends further than the pivotable striker toward the seat back, thereby overcoming a biasing force of a biasing mechanism that biases the pivotable striker toward the first position even when the pivotable striker is in the second position;
holding the pivotable striker in the second position against the biasing force; and
during said holding, pivoting the seat back toward the fixed striker until the latching mechanism latches to the fixed striker, the seat back thereby being locked in a second seating position with respect to the vehicle body.

18. The method of claim 17, further comprising:
unlatching the latching mechanism from the fixed striker;
pivoting the seat back away from the fixed striker, thereby causing the biased pivotable striker to automatically pivot to the first position;
pivoting the seat back toward the pivotable striker until the latching mechanism latches to the pivotable striker, the seat back thereby being locked in the first seating position.

19. The vehicle seat assembly of claim 2, wherein the biasing mechanism biases the pivotable striker toward the first position even when the pivotable striker is in the second position.

20. The vehicle of claim 10, wherein the fixed striker is generally U-shaped and has a first arm and a second arm spaced from one another, and a midportion extending between and connected to the first arm and the second arm; wherein the second arm supports the pivotable striker and defines an axis of rotation of the pivotable striker along a length of the second arm.

* * * * *